US011540095B2

(12) United States Patent
Mattioli

(10) Patent No.: US 11,540,095 B2
(45) Date of Patent: Dec. 27, 2022

(54) PROJECTING CONTENT FROM EXERCISE EQUIPMENT

(71) Applicant: Goldman Sachs & Co. LLC, New York, NY (US)

(72) Inventor: Michael Mattioli, Staten Island, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 394 days.

(21) Appl. No.: 16/885,100

(22) Filed: May 27, 2020

(65) Prior Publication Data

US 2021/0370132 A1  Dec. 2, 2021

(51) Int. Cl.
*H04W 4/38* (2018.01)
*H04W 4/80* (2018.01)

(52) U.S. Cl.
CPC .............. *H04W 4/38* (2018.02); *H04W 4/80* (2018.02)

(58) Field of Classification Search
CPC .................................. H04W 4/38; H04W 4/80
See application file for complete search history.

(56) References Cited

U.S. PATENT DOCUMENTS

| 2007/0219059 A1* | 9/2007 | Schwartz | A61B 5/02405 482/8 |
| 2008/0153670 A1* | 6/2008 | McKirdy | A63B 24/0059 482/1 |
| 2010/0062818 A1* | 3/2010 | Haughay, Jr. | A63F 13/245 482/8 |
| 2011/0050707 A1* | 3/2011 | Kim | A63B 71/0619 345/467 |
| 2012/0053016 A1* | 3/2012 | Williamson | A63B 71/0686 482/84 |
| 2013/0032634 A1* | 2/2013 | McKirdy | A61B 5/0205 235/375 |
| 2013/0040271 A1* | 2/2013 | Rytky | G16H 20/30 434/247 |
| 2013/0127636 A1* | 5/2013 | Aryanpur | H04Q 9/00 340/870.07 |

(Continued)

FOREIGN PATENT DOCUMENTS

WO  WO 2018/206987 A1  11/2018

OTHER PUBLICATIONS

PCT International Search Report and Written Opinion, PCT Application No. PCT/IB2021/052978, dated Jul. 15, 2021, nine pages.

*Primary Examiner* — Chris Parry
*Assistant Examiner* — Hassan A Khan
(74) *Attorney, Agent, or Firm* — Fenwick & West LLP

(57) ABSTRACT

Described herein is a mechanism for preventing exercise devices from storing user exercise data and enabling the user to securely record that data. When a user selects an exercise device for performing an exercise, a user's device may establish a connection with the exercise device. When an exercise program is started on the exercise device, the user's device interfaces with the sensors directly while bypassing the computing device. When a direct sensor link with the sensors is created, the sensor link replaces a link between the sensors and the computing device on the exercise equipment. The user's device then receives exercise data through the sensor link directly from the sensors bypassing the computing device on the exercise equipment.

18 Claims, 6 Drawing Sheets

(56) References Cited

U.S. PATENT DOCUMENTS

| | | | | |
|---|---|---|---|---|
| 2013/0135115 A1* | 5/2013 | Johnson | ............... | H04W 56/001 340/870.02 |
| 2013/0178334 A1* | 7/2013 | Brammer | ................ | A63F 13/06 482/4 |
| 2014/0156038 A1* | 6/2014 | Poyhtari | ................ | G16H 40/67 700/91 |
| 2015/0238819 A1* | 8/2015 | Volkerink | ............... | G08C 17/02 482/4 |
| 2015/0359467 A1* | 12/2015 | Tran | ....................... | A61B 5/389 600/595 |
| 2016/0007885 A1* | 1/2016 | Basta | ..................... | A61B 5/112 600/595 |
| 2016/0179206 A1* | 6/2016 | LaForest | ................. | G06F 1/163 345/156 |
| 2016/0287930 A1* | 10/2016 | Moser | ................. | A63B 24/0087 |
| 2016/0346617 A1* | 12/2016 | Srugo | .................. | A63B 21/072 |
| 2016/0361599 A1* | 12/2016 | McKirdy | ........... | G06K 19/0718 |
| 2017/0144025 A1* | 5/2017 | Abbondanza | ...... | A63B 24/0087 |
| 2017/0163785 A1* | 6/2017 | Kim | ........................ | H04W 4/80 |
| 2017/0185750 A1* | 6/2017 | Kang | ................. | G06Q 10/1097 |
| 2017/0203157 A1* | 7/2017 | Volkerink | .......... | A63B 22/0242 |
| 2018/0256961 A1* | 9/2018 | Shi | ........................ | G06F 3/0346 |
| 2018/0270289 A1* | 9/2018 | Root | ....................... | A61B 5/743 |
| 2018/0302403 A1* | 10/2018 | Souders | .............. | H04L 63/0861 |
| 2019/0008394 A1* | 1/2019 | Rao | ........................ | G16H 50/30 |
| 2020/0164248 A1* | 5/2020 | Delaney | ............ | A63B 21/0054 |
| 2021/0060384 A1* | 3/2021 | Choi | .................. | A63B 24/0062 |
| 2021/0346752 A1* | 11/2021 | Holmes | .............. | A63B 24/0075 |
| 2021/0377346 A1* | 12/2021 | Zhou | ....................... | H04W 4/80 |
| 2022/0212060 A1* | 7/2022 | Davis | ..................... | G06V 40/23 |

* cited by examiner

PROJECTING CONTENT FROM EXERCISE EQUIPMENT

TECHNICAL FIELD

This disclosure generally relates to exercise equipment use, and more particularly to preventing user data from being recorded and stored on exercise equipment.

BACKGROUND

There are many types of exercise equipment systems on the market today (e.g., treadmills, elliptical machines, exercise bikes, and others). Many modern exercise equipment systems have built-in computing devices that enable tracking of exercise data (e.g., tracking of speed, rotations per minute, user's heartrate, and/or other exercise data) by using sensors built into these exercise systems. Thus, when a user exercises using these systems, the user's exercise data is saved to these systems, at least for some period of time. These systems may be insecure, and in some instances a bad actor may be able gain access to a user's health information (e.g., heartrate during exercise, fitness levels, and other information) while that information resides on these exercise systems. Thus, storing health information, even temporarily, on these systems is not desirable in many instances. On the other hand, some users like to track their exercise regimens and desire that exercise information be available to them.

SUMMARY

This disclosure describes a mechanism for preventing exercise devices from storing user exercise data while still enabling that data to be securely recorded. A large number of people possess smart devices (e.g., smart phones and/or electronic tablets) and carry those devices with them when they exercise. Therefore, an exercise equipment system may use a user's smart device to provide exercise parameters to a user while keeping the user's data secure. When a user selects an exercise device (e.g., an exercise bike), for performing an exercise, the user's device may establish a connection with the exercise device (e.g., with a computing device coupled with the exercise device).

When an exercise program is started on the exercise device, the user's smart device interfaces with the sensors directly while bypassing the computing device (e.g., by receiving connection parameters from the exercise device and interfacing with the sensors directly using those connection parameters). When a direct sensor link with the sensors is created, the sensor link may replace a link between the sensors and the computing device on the exercise equipment. The smart device may then receive exercise data through the sensor link directly from the sensors bypassing the computing device coupled with the exercise equipment. In some embodiments, the smart device may generate for display some of the exercise data as that data is received.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
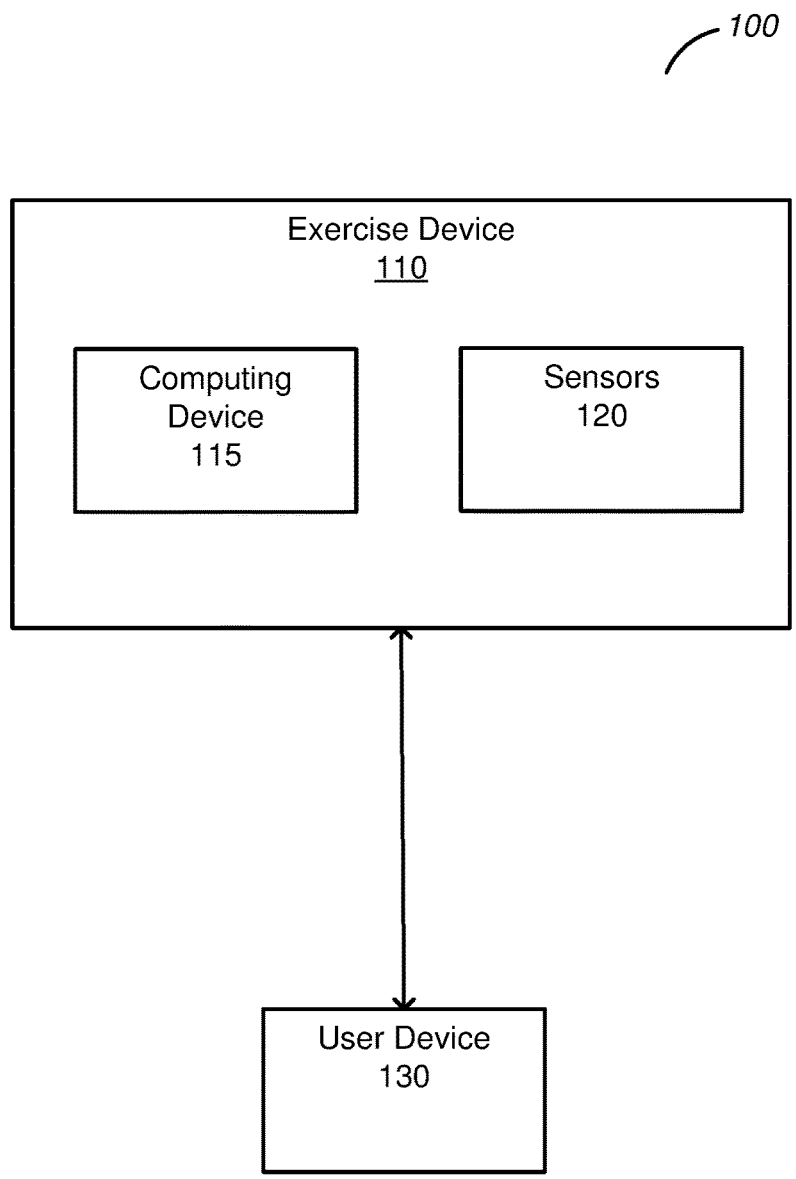
FIG. 1 illustrates one embodiment of a system that prevents exercise devices from storing user exercise data, in accordance with some embodiments of this disclosure.

FIG. 1 illustrates one embodiment of a system that prevents exercise devices from storing user exercise data. System 100 includes an exercise device 110 and user device 130. Exercise device 110 may be coupled with a computing device 115 and sensors 120. Computing device 115 may include multiple components (e.g., any components illustrated in FIG. 3). For example, the computing device may include a processor, main memory, static memory, network interface device and/or other components shown in FIG. 3. Furthermore, the computing device may include a screen for displaying information to a user.

Sensors 120 may include one or more sensors coupled with the exercise equipment. Different exercise equipment devices may have different sensors. For example, a treadmill may include one or more speed sensors for regulating how fast the treadmill should be operating to enable a user to set a desired speed setting. An exercise bike may include sensors for measuring rotations per minute, pedaling cadence, speed, resistance (e.g., indicating an inclined road). Elliptical machines may include a user speed sensor (i.e., how fast the user is moving the pedals), a weight sensor, and/or any other suitable sensors. Any of these machines may include a heart rate sensor or monitor and/or any other sensors.

User device 130 may be a portable computer, a smart phone, an electronic tablet, or another suitable device and may include hardware (e.g., circuitry) and/or software components. An application may reside on user device 130 for interfacing with exercise device 110. Thus, the application may use hardware components of user device 130 to connect with computing device 115 and/or connect with sensors 120. In some embodiments, the user device may include a port for connecting with exercise device 110. Exercise device 110 may also include a port for connecting with user device 130. A user may use a cable to connect the two ports. When user device 130 senses a connection with exercise device 110 (e.g., based on a signal from the port's hardware), device 130 may launch an application for preventing exercise devices from receiving user exercise data.

In some embodiments, user device 130 and exercise device 110 may be enabled to connect wirelessly. For example, each of user device 130 and exercise device 110 may include a wireless transceiver that may be used for connecting user device 130 and exercise device 110. These devices may connect over a wireless protocol (e.g., Bluetooth, WiFi, Zigbee, or another suitable protocol). User device 130 may include an application that may detect (e.g., using wireless transmissions from exercise device 110) that exercise device 110 is within range and transmit data for connecting to exercise device 110. Exercise device 110 may also have an application that may use a wireless transceiver (not shown) to transmit a presence signal to facilitate user device connections. The application may be enabled to receive a response from user device 130 to establish a connection.

Figure 2:
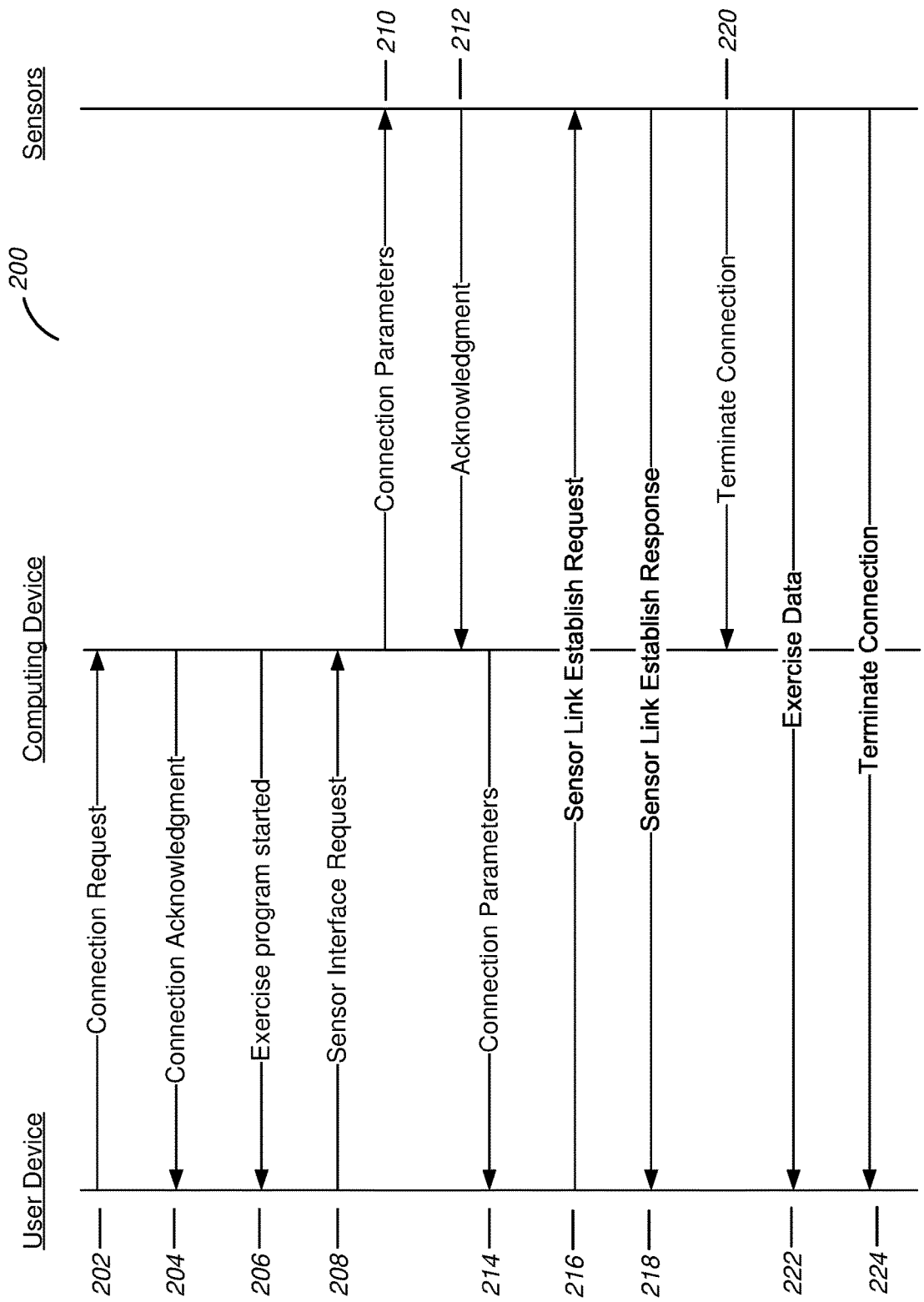
FIG. 2 illustrates actions that a system performs for preventing an exercise device from storing user exercise data, in accordance with some embodiments of this disclosure.

FIG. 2 illustrates actions that system 200 may perform to prevent an exercise device from storing user exercise data. FIG. 2 shows a user device (e.g. user device 130), a computing device coupled with the exercise equipment (e.g., computing device 115), and sensors coupled with the exercise device (e.g., sensors 120). For example, the sensors may be built into various parts of the exercise device. At 202, the user device transmits a connection request to the computing device. The computing device may be transmitting a presence signal that the user device may receive. Based on the presence signal, the user device may launch the application for connecting with the computing device. An application on the user device may transmit connection request 202.

The computing device may receive connection request 202 and transmit a connection acknowledgment to the user device. The connection acknowledgment may include information required to establish a connection between the user device and the computing device. When the computing device receives user input to start the exercise program (e.g., resistance, length, and/or other suitable input), the computing device may transmit notification 206 to the user device indicating that an exercise program is starting. The user device may receive notification 206 and transmit sensor interface request 208 to the computing device. Sensor interface request 208 may include information required to establish a sensor link with the sensors. For example, sensor interface request 208 may include an identifier associated with the user device. The identifier may be a passkey (e.g., a one-time pass key for connecting with the user device), a user device identifier (e.g., an alphanumeric string of a device name), or another suitable identifier.

The computing device may receive sensor interface request 208 and transmit connection parameters 210 to the sensors. The connection parameters may include at least some data received in the sensor interface request. For example, connection parameters 210 may include a device identifier, a passkey, or another piece of data that identifies the user device. In some embodiments, the computing device may use an encryption algorithm to encrypt the identifier and send an encrypted identifier as part of connection parameters 210. In some embodiments, the sensors may be connected to an aggregating device that can receive input from multiple sensors and aggregate that input. When the input is aggregated, the aggregating device may send the sensor input out (e.g., to the user device and/or the computing device). Thus, the aggregating device may receive connection parameters 210 from the computing device and transmit acknowledgment 212 to the computing device.

In some embodiments, each sensor may have its own connection to the computing device (i.e., there may not be an aggregating device in place). Thus, the computing device may transmit connection parameters 210 to each sensor. In turn, each sensor may transmit an acknowledgment 212 to the computing device. In some embodiments, the computing device may wait to receive an acknowledgment from every sensor before proceeding to the next action.

The computing device may transmit connection parameter 214 to the user device. In some embodiments, connection parameters 214 and connection parameters 210 may be the same connection parameters. For example, if the user device is connected to the exercise device with a cable, the computing device may send a passcode to the sensors and the same passcode to the user device. After sending the passcode, the computing device may switch into passive mode where it just passes along any data being send/ received between the user device and the sensors. In some embodiments, the data being passed through may be encrypted so that the computing device is unable to decrypt the data (e.g., using an encryption protocol between the sensors and the user device).

In some embodiments, connection parameters 210 and connection parameters 214 may be different connection parameters. For example, if the user device is connecting to the sensors (e.g., to the aggregating device, or directly) wirelessly, the computing device may transmit to the user device one or more identifiers for the sensors. If the sensors are communicating through an aggregating device, the computing device may transmit to the user device, as part of connection parameters 214, a wireless identifier of the aggregating device so that the user device is able to wirelessly connect directly to the aggregating device. The computing device may transmit, as part of connection parameters 210, an identifier of the user device so that that the aggregating device is able to authenticate the user device and properly connect. Other authentication and/or authorization parameters may be transmitted between the user device and the sensors.

In some embodiments, if the sensors are not communicating with an aggregating device (e.g., the aggregating device is not present), the computing device may transmit to the user device, as part of connection parameters 214, a unique identifier for each sensor. The computing device may also transmit an identifier of the user device to each sensor for establishing a sensor link with the user device. The user device may receive connection parameters 214 and attempt to connect to the sensors using those parameters.

The user device may transmit sensor link establish request 216 to the sensors. For example, if the user device is attempting to wirelessly connect with each sensor, the user device may transmit a sensor link establish request to each sensor (e.g., using Bluetooth connection protocol). Each sensor link establish request 216 may include an identifier and/or other connection parameters received from the computing device. For example, sensor link establish request 216 may include a passkey that was generated by the computing device and sent to each sensor as part of connection parameters 210. In some embodiments, sensor link establish request 216 may include an identifier of the user device (e.g., an alphanumeric string representing the device). If the user device is wirelessly connecting with an aggregating device, the user device may transmit sensor link establish request 216 to the aggregating device. The request may include an identifier of the user device. In some embodiments, sensor link establish request 216 may include other data (e.g., protocol identifier, sensor identifier, and/or other suitable data).

Each sensor may receive a corresponding sensor link establish request 216 and may authenticate the corresponding sensor link establish request 216. Each sensor may use information received as part of connection parameters 210 to authenticate the corresponding request. For example, each sensor may compare the identifier of the user device received in connection parameters 210 with the identifier received in sensor link establish request 216. If the identifiers match, a given sensor determines that the request is valid. In some embodiments, each sensor may compare a passkey received in connection parameters 210 with the passkey received in sensor link establish request 216. If the passkeys match, a given sensor may determine that sensor link establish request 216 is valid. It should be noted that other methods of authenticating sensor link establish requests may be used here. For example, public/private key signatures may be used.

In some embodiments, if an aggregating device is built into the exercise device, the user device may transmit sensor link establish request 216 to the aggregating device. The aggregating device may perform the authentication as described above (e.g., using an identifier, a passkey, or another suitable authentication method). When sensor link establish request 216 has been authenticated, the sensors (e.g., each sensor or the aggregating device) may transmit sensor link establish response 218 to the user device (e.g., directly in wireless configurations, or as a passthrough through computing device in wired configurations). Sensor link establish response 218 may include various communication parameters that establish a communication between the sensors and the user device. The sensors (e.g., each sensor or the aggregating device) may transmit a terminate connection notification 220 to the computing device, notifying the computing device that sensor output will no longer be transmitted to the computing device. In embodiments where the user device and the sensor communicate wirelessly, the sensor may transmit a wireless signal directly to the user device bypassing the computing device.

In embodiments where the user device and the sensors communicate through a wire, the terminate connection notification may instruct the computing device to go into bypass mode, where the computing device sends received exercise data directly to the user device without processing/storing that data locally.

Computing Machine Architecture

Figure 3:
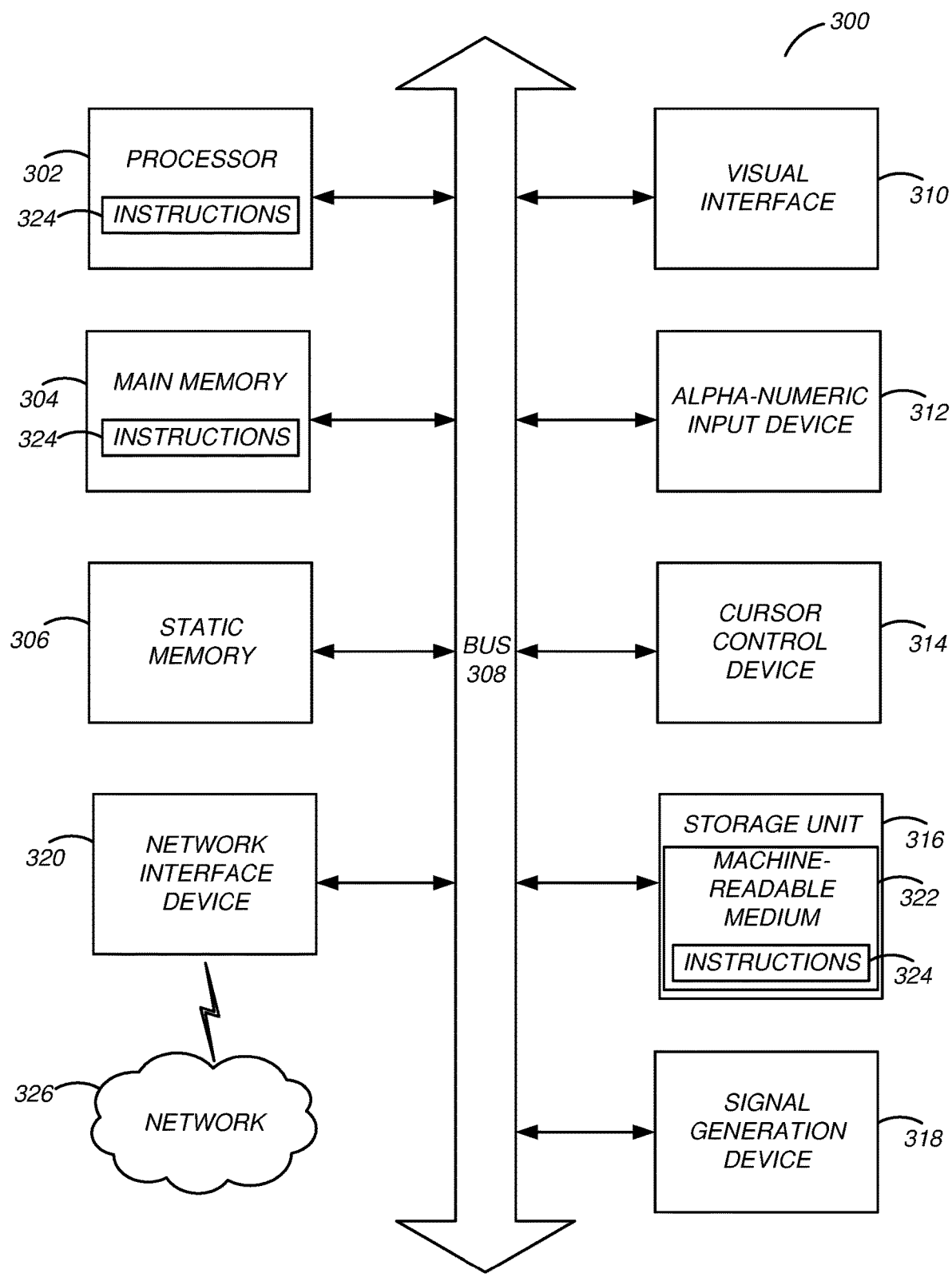
FIG. 3 is a block diagram illustrating components of an example machine able to read instructions from a machine-readable medium and execute them in a processor (or controller).

The actions of FIG. 2 may be implemented using the components of a device illustrated in FIG. 3. FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Figure 4:
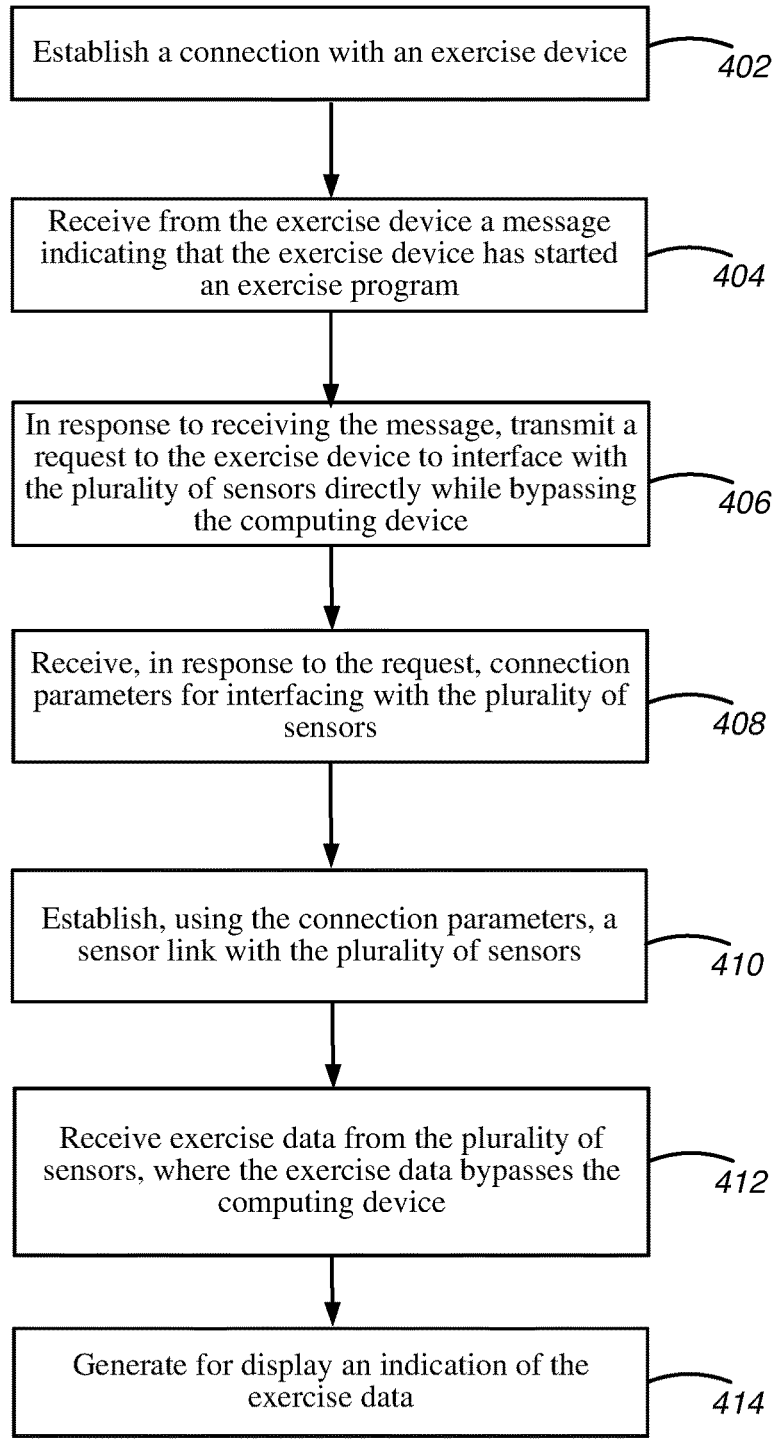
FIG. 4 illustrates one example of actions for preventing exercise devices from storing user exercise data, in accordance with some embodiments of this disclosure.

The components of FIG. 3 may be used to implement the actions of FIG. 4. FIG. 4 illustrates one example of actions for preventing exercise devices from storing user exercise data. At 402, a user device establishes a connection with an exercise device. As illustrated in FIG. 3, a user device may be a computing device that includes a network interface device (e.g., network interface device 326). The exercise device may also have a built-in computing device with at least some of the components illustrated in FIG. 3. Both the user device and the exercise device (e.g., a computing device coupled with the exercise device) may include a network interface device (e.g., network interface device 320). The network interface device may enable wired and/or wireless communications to establish a connection.

At 404, the user device receives from the exercise device a message indicating that the exercise device has started an exercise program. For example, the computing device built into the exercise device may be executing an application (e.g., using processor 302 and/or main memory 304) that enables a user to begin an exercise program. The program being executed on the computing device may transmit the message to the user device using, for example, network interface device 320. The user device may receive the message using its own network interface device.

At 406, in response to receiving the message, the user device transmits a request to the exercise device to interface with the plurality of sensors directly while bypassing the computing device. The user device may be executing (e.g., using processor 302 and main memory 304) an application that executes code for performing the actions of FIG. 4. The application may transmit the message using a network interface device (e.g., network interface device 320). In some embodiments, the request may include an identifier of a user device that is requesting the sensor link. The identifier may then be transmitted to the sensors to be used in the connection process (e.g., to authenticate or validate the user device). In some embodiments, the connection parameters for interfacing with the plurality of sensors include one or more codes that authenticate a user device requesting the sensor link to the one or more sensors.

At 408, the user device receives, in response to the request, connection parameters for interfacing with the plurality of sensors. The user device my receive the connection parameters through network interface device 320. The connection parameters may be relayed to the application on the user device that is interfacing with the exercise device. When the application receives the connection parameters, the application may store the received information in main memory 304 and/or storage unit 316.

At 410, the user device establishes, using the connection parameters, a sensor link with the plurality of sensors. The sensor link replaces a link between the plurality of sensors and the computing device. The user device (e.g., an application the user device) may use network interface device 320 to establish a connection with the sensor link. For example, the application may transmit, via network interface device 320, at least some of the connection parameters to the sensors (e.g., to the aggregating device or to each sensor). In response, the sensors (e.g., the aggregating device or each sensor) may transmit data to the user device to establish a connection. In some embodiments, the user device may transmit a command to the sensors to stop transmitting sensor data to the computing device (e.g., a command to bypass the computing device).

At 412, the user device receives exercise data from the plurality of sensors, where the exercise data bypasses the computing device. The application on the user device may communicate, via a network interface device with the sensor directly. The network interface device may be network interface device 320 or another network interface device (e.g., a network interface device that support short range communication protocols, for example, Bluetooth).

Figure 5:
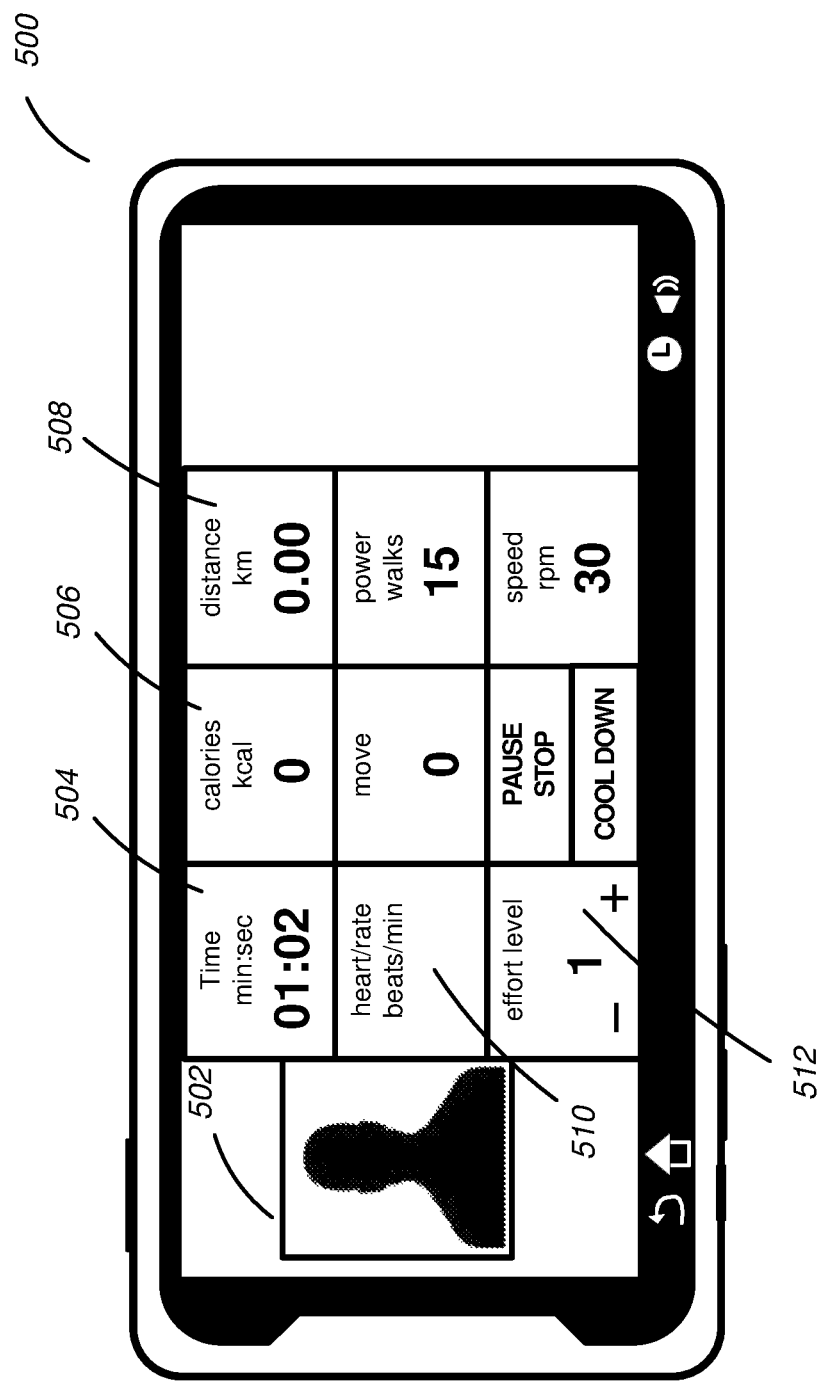
FIG. 5 illustrates a smartphone screen that displays an output of the exercise data received from the sensors, in accordance with some embodiments of this disclosure.

At 414, the user device generates for display an indication of the exercise data. FIG. 5 illustrates a smartphone screen that displays an output of the exercise data received from the sensors. In some embodiments, the user device generates for display the exercise data within a user interface generated based on a user interface template used by the computing device to display the progress of the exercise program to a user received from the computing device. For example, the computing device may transmit a graphic user interface template to the user device that can be used to display the received exercise data. FIG. 5 illustrates such an interface.

The graphical user interface of FIG. 5 may include a picture or avatar representing a user (picture 502), time 504 for tracking the user's exercise time, calorie display 506 for displaying to the user number of calories burned, distance display 508 for displaying the distance that the user covered, heart rate display 510, effort level display 512, and other suitable displays. The template illustrated in FIG. 5 may be received from the computing device or retrieved from memory of the user device. The template may include a configuration that enables the display to show exercise data being received from the sensors.

Figure 6:
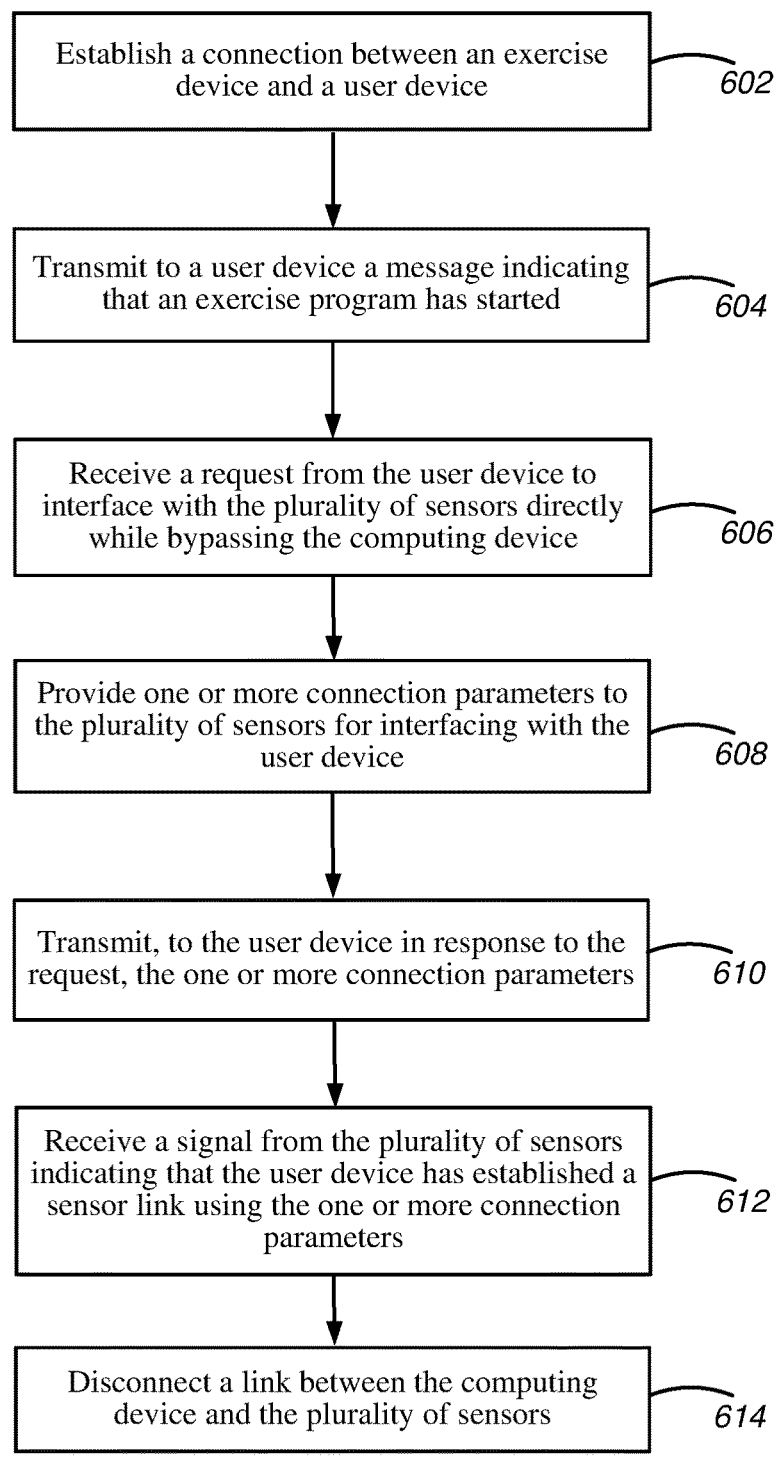
FIG. 6 illustrates another example of actions for preventing exercise devices from storing user exercise data, in accordance with some embodiments of this disclosure.

FIG. 6 illustrates another example of actions for preventing exercise devices from receiving user exercise data. While the actions of FIG. 4 may be from the perspective of the user device, actions of FIG. 6 are from the perspective of the computing device coupled with the exercise device. At 602, the computing device establishes a connection between an exercise device and a user device. The computing device may use network interface device 320 to transmit a presence signal to nearby devices and when a nearby user device requests a connection, the computing device may transmit information to the user device to establish the connection.

At 604, the computing device transmits to a user device a message indicating that an exercise program has started. An application being executed on the computing device may transmit the message (e.g., via network interface device 320). The application may transmit the message over the established connection. The message may include various data about the exercise program (e.g., duration, resistance, target cadence, and/or other suitable data).

At 606, the computing device receives a request from the user device to interface with the plurality of sensors directly while bypassing the computing device. The computing device may receive the request via network interface device 320 and pass it to the program being executed on the computing device. The program may store (e.g., in main memory 304 and/or storage unit 316) the request, including any connection parameters that may be sent with the request. The connection parameters transmitted with the request may be connection parameters required for the sensors to connect to the user device.

At 608, the computing device provides one or more connection parameters to the plurality of sensors for interfacing with the user device. In some embodiments, the computing device may be coupled with multiple sensors using one or more wires. In those embodiments, the computing device may transmit the connection parameters to each sensor via a corresponding wire or if the sensors are connected to an aggregating device, the computing device my transmit the connection parameters to the aggregating device through a wire. In some embodiments, the computing device may be connected to the sensors wirelessly and transmit the connection parameters wirelessly. These connection parameters may include at least some connection parameters received from the user device and that are required for the sensor to connect to the user device (e.g., user device identifier, passcode, and/or other suitable parameters).

At 610, the computing device transmits, to the user device in response to the request, the one or more connection parameters. In some embodiments, the one or more connection parameters are the same as the connection parameters transmitted to the user sensors (e.g., a passcode for a direct connection). In some embodiments, one or more of the connection parameters are different. For example, the connection parameters transmitted to the sensors may be connection parameters required to connect to the user device (e.g., user device identifier, passcode, passkey, and/or other suitable parameters), while the connection parameters transmitted to the user device are connection parameters required to connect to the sensor (e.g., passcode, identifier of the aggregating device, identifier of each sensor, and/or other suitable parameters).

At 612, the computing device receives a signal from the plurality of sensors indicating that the user device has established a sensor link using the one or more connection parameters. The computing device may receive the signal through network interface device 320. At 614, the computing device disconnects a link between the computing device and the plurality of sensors. The computing device may wait for a request from the sensors to reconnect back to the computing device after the user device has disconnected from the sensors and/or the exercise program has finished.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for preventing storing a user's health data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of a user device for preventing exercise devices from receiving user exercise data, the method comprising:

establishing, by the user device, a connection with an exercise device that includes a computing device and a plurality of sensors, the computing device configured to store exercise data sensed by the plurality of sensors via a first link between the computing device and the plurality of sensors;

transmitting, by the user device, a request to the exercise device, the request for the user device to directly interface with the plurality of sensors rather than interface directly interface with the computing device;

transmitting, by the user device, a command to the plurality of sensors to stop transmitting sensor data to the computing device;

establishing, by the user device, a second link with the plurality of sensors using connection parameters, the second link replacing the first link between the computing device and the plurality of sensors thereby bypassing the computing device;

receiving, by the user device, exercise data sensed by the plurality of sensors during an exercise program of the exercise device, the exercise data received by the user device via the second link without the exercise data being transmitted to the computing device for storage via the first link; and displaying, by the user device, the received exercise data.

2. The method of claim 1, further comprising:
receiving from the exercise device a message indicating that the exercise device has started the exercise program,
wherein the request for the user device to directly interface with the plurality of sensors is transmitted responsive to receiving the message from the exercise device.

3. The method of claim 2, further comprising:
receiving the connection parameters for establishing the second link with the plurality of sensors responsive to transmitting the request.

4. The method of claim 1, wherein establishing the second link with the plurality of sensors comprises:
establishing the second link with an aggregating device of the exercise device, the aggregating device receiving input from each of the plurality of sensors.

5. The method of claim 1, wherein establishing the second link with the plurality of sensors comprises:
establishing a direct connection with each of the plurality of sensors.

6. The method of claim 1, wherein the request transmitted to the exercise device includes an identifier of the user device that is requesting the second link, the method further comprising:
receiving an indication from the exercise device that the computing device has transmitted the identifier of the user device to the plurality of sensors.

7. The method of claim 3, wherein receiving the connection parameters comprises:
receiving one or more codes that authenticate the user device requesting the second link to the one or more sensors.

8. The method of claim 1, wherein displaying the received exercise data comprises:
generating a user interface on the user device that displays the exercise data and progress of the exercise program based on a user interface template received from the computing device.

9. A method of an exercise device for preventing receipt of user exercise data, the method comprising:
establishing, by the exercise device, a connection with a user device, wherein the exercise device includes a computing device and a plurality of sensors, the computing device configured to store exercise data sensed by the plurality of sensors via a first link between the computing device and the plurality of sensors;
receiving, by the exercise device, a request from the user device to directly interface with the plurality of sensors rather than interface directly interface with the computing device;
receiving, by the exercise device, a command from the user device for the plurality of sensors to stop transmitting sensor data to the computing device;
establishing, by the exercise device, a second link between the user device and the plurality of sensors using connection parameters, the second link replacing the first link between the computing device and the plurality of sensors thereby bypassing the computing device; and
transmitting, by the exercise device, exercise data sensed by the plurality of sensors during an exercise program of the exercise device, the exercise data transmitted to the user device via the second link without the exercise data being transmitted to the computing device for storage via the first link.

10. The method of claim 9, further comprising:
disconnecting the first link between the computing device and the plurality of sensors.

11. The method of claim 9, further comprising:
transmitting a message to the user device indicating that the exercise device has started the exercise program,
wherein the request for the user device to directly interface with the plurality of sensors is received responsive to transmitting the message from the exercise device.

12. The method of claim 11, further comprising:
transmitting, to the user device, the connection parameters for the user device to establish the second link with the plurality of sensors responsive to receiving the request.

13. The method of claim 9, wherein establishing the second link with the plurality of sensors comprises:
establishing the second link between the user device and an aggregating device of the exercise device, the aggregating device receiving the sensed exercise data from the plurality of sensors.

14. The method of claim 9, wherein establishing the second link with the plurality of sensors comprises:
establishing a direct connection between the user device and each of the plurality of sensors.

15. The method of claim 9, wherein the request includes an identifier of the user device that is requesting the second link, the method further comprising:
transmitting an indication to the user device that the computing device has transmitted the identifier of the user device to the plurality of sensors.

16. The method of claim 12, wherein transmitting the connection parameters comprises:
transmitting one or more codes that authenticate the user device requesting the second link to the one or more sensors.

17. A non-transitory computer-readable medium comprising memory with instructions encoded thereon for preventing exercise devices from receiving user exercise data, the instructions causing one or more processors to perform operations when executed, the instructions comprising instructions to:
establishing, by the user device, a connection with an exercise device that includes a computing device and a plurality of sensors, the computing device configured to store exercise data sensed by the plurality of sensors via a first link between the computing device and the plurality of sensors;
transmitting, by the user device, a request to the exercise device, the request for the user device to directly interface with the plurality of sensors rather than interface directly interface with the computing device;
transmitting, by the user device, a command to the plurality of sensors to stop transmitting sensor data to the computing device;
establishing, by the user device, a second link with the plurality of sensors using connection parameters, the second link replacing the first link between the computing device and the plurality of sensors thereby bypassing the computing device;
receiving, by the user device, exercise data sensed by the plurality of sensors during an exercise program of the exercise device, the exercise data received by the user device via the second link without the exercise data being transmitted to the computing device for storage via the first link; and
displaying, by the user device, the received exercise data.

18. An exercise device comprising:

a plurality of sensors configured to sense exercise data;

a computing device configured to store the exercise data;

a first link configured to connect the computing device to the plurality of sensors, wherein the exercise device receives a command from a user device for the plurality of sensors to stop transmitting sensor data to the computing device and the plurality of sensors are further configured to transmit exercise data sensed during an exercise program to the user device via a second link between the plurality of sensors and the user device without the exercise data being transmitted to the computing device for storage via the first link responsive to a request from the user device to directly interface with the plurality of sensors rather than directly interface with the computing device.

* * * * *